United States Patent [19]
Lee et al.

[11] 3,918,932
[45] Nov. 11, 1975

[54] METHOD AND APPARATUS FOR COLLECTING AND DISPOSING OF FUEL VAPORS

[75] Inventors: Yuan C. Lee, Newport Beach; Jules M. Kline, Silverado; Marvin L. Stary, Claremont, all of Calif.

[73] Assignee: Environics, Inc., Huntington Beach, Calif.

[22] Filed: Mar. 6, 1974

[21] Appl. No.: 448,719

[52] U.S. Cl. .......................... 55/62; 55/88; 55/387; 23/288 F
[51] Int. Cl.² .................................... B01D 53/04
[58] Field of Search .......... 23/288 F; 55/20, 58, 62, 55/88, 163, 179, 387; 141/52, 295; 423/210

[56] References Cited
UNITED STATES PATENTS

| | | | |
|---|---|---|---|
| 2,723,070 | 11/1955 | Merriam | 141/52 |
| 2,853,149 | 9/1958 | Gosselin | 55/88 X |
| 3,533,218 | 10/1970 | Hunt et al. | 55/387 |
| 3,543,484 | 12/1970 | Davis | 55/387 |
| 3,581,782 | 6/1971 | Onufer | 141/52 X |
| 3,645,098 | 2/1972 | Templin et al. | 23/288 F X |
| 3,657,892 | 4/1972 | Perga et al. | 23/288 F X |
| 3,714,790 | 2/1973 | Battey | 55/88 X |
| 3,755,534 | 8/1973 | Graham | 23/288 F X |

*Primary Examiner*—Charles N. Hart
*Assistant Examiner*—Robert H. Spitzer
*Attorney, Agent, or Firm*—Poms, Smith, Lande & Glenny

[57] ABSTRACT

To prevent the pollution of air caused by hydrocarbon fuel vapors escaping during fueling of vehicles and other fuel transfers, the noxious fumes are collected and converted into the nonpollutants of water vapor and carbon dioxide which may be later discharged into the surrounding atmosphere. Vapor collection conduits having a partial vacuum formed therein serve to draw off the otherwise escaping fuel vapors at the filler opening of the vehicle, or at the vent piping of an underground storage tank, whereupon the collected vapors are passed into canisters containing carbon beds for temporarily storing the peak vapor emissions by an adsorption process. Thereafter, the vapors are retrieved from the storage canisters by pumping air therethrough to form a suitable air and vapor fuel mixture which is passed into a catalytic reactor. The fuel mixture is substantially completely oxidized in the reactor to form the water vapor and carbon dioxide end products.

17 Claims, 6 Drawing Figures

METHOD AND APPARATUS FOR COLLECTING AND DISPOSING OF FUEL VAPORS

BACKGROUND OF THE INVENTION

In general, the present invention relates to pollution control equipment, and more particularly to a method and apparatus for reducing air pollution by capturing and disposing of noxious fuel vapors normally released into the atmosphere during refueling of motor vehicles, aircraft and boats. Also, the invention is concerned with the disposal of fuel vapors which may escape during the transfer of fuels in general, such as during the filling of large, fixed or portable, storage tanks.

It has been known for sometime that one of the significant causes of air pollution may be attributed to escaping hydrocarbon fuel vapors during refueling of vehicles at service stations. The accumulative affect of many thousands of autombiles being refueled during the day and night in large metropolitan areas contributes to the ever increasing seriousness of air pollution.

Although efforts have been made heretofore to reduce these air contaminating vapors, no satisfactory solution has been found prior to the present invention. The capturing and disposing of vapors given off during fueling or refueling of motor vehicles must be capable of converting a large percentage of the collected vapors into nonpolluting end products. Moreover, this collection and conversion operation must be effected at a reasonably high degree of efficiency such that the energy required to operate the collection and disposal equipment is kept to a minimum.

Additional features of a successful system include reliability, long life, ease of operation together with minimum maintenance, and of course a high degree of safety.

These are objectives which the method and aparatus in accordance with the present invention has achieved. In addition to these, it is also desirable in certain installations to provide in the present method and apparatus the capability of collecting and disposing of fuel vapors given off not only from the refueling of motor vehicles, but also those vapors which may escape from underground storage tanks following a bulk fuel drop.

Another associated object of the present invention is to provide an improved means for collecting fuel vapors which otherwise escape adjacent the fuel dispenser nozzle while disposed within the filler opening of the vehicle tank. The ability to capture the great majority of vapors otherwise escaping into the ambient atmosphere at the vehicle fuel tank filler opening contributes significantly to the overall effectiveness of the disposal system.

SUMMARY OF THE INVENTION

Briefly, the method and apparatus in accordance with the particular embodiments of the invention disclosed herein provide for collecting the fuel vapors at the filler opening of the vehicle and/or at the vent piping or conduit of the bulk storage tanks normally installed underground at the service station. The vapors are drawn into a vapor collection line or conduit by a partial vacuum produced by an air pump connected downstream in the system.

The outlet of the vapor collection line is connected to one or more carbon bed canisters containing carbon granules which serve as an adsorbent substance for the fuel vapors. During periods of peak fuel vapor emissions, the canisters of carbon granules serve to temporarily store the fuel vapors by adsorption. Subsequently, the stored fuel vapors are retrieved from the storage conisters by passing air through the carbon beds to produce an air and fuel vapor mixture. This air and fuel mixture is transferred to a catalytic reactor by the aforementioned air pump disposed in a conduit connecting the storage conisters with the reactors. The air and fuel mixture is properly proportioned to achieve substantially complete oxidation of the vapors in the reactor to produce the end products of water vapor or water and carbon dioxide.

In the particular embodiments of the invention disclosed herein, a series of valves, some of which are automatically operated by a control unit, serve to adjust the fuel vapor to air ratio to achieve maximum oxidation. Similarly, the temporary storage of fuel vapors during peak emission periods serve as a means for subsequently retrieving and oxidizing all of the emitted vapors at a low and selected fuel to air ratio.

To ensure the capture of most all of the vapors emitted adjacent the filler opening of a vehicle tank, an improved vapor collection attachment for mounting on a conventional gasoline dispenser nozzle is provided. The attachment forms an annular channel about the exterior of the dispenser nozzle, at which a partial vacuum is drawn by the above-mentioned air pump to suck in air and fuel vapors rising through the neck of the vehicle filler opening.

These and further objects, features and advantages of the method and apparatus according to the present invention will become apparent to those skilled in the art from a consideration of the following detailed description and appended drawings of a few particular embodiments of the invention.

DESCRIPTION OF THE PREFERRED EMBODIMENTS

Figures 1, 4:
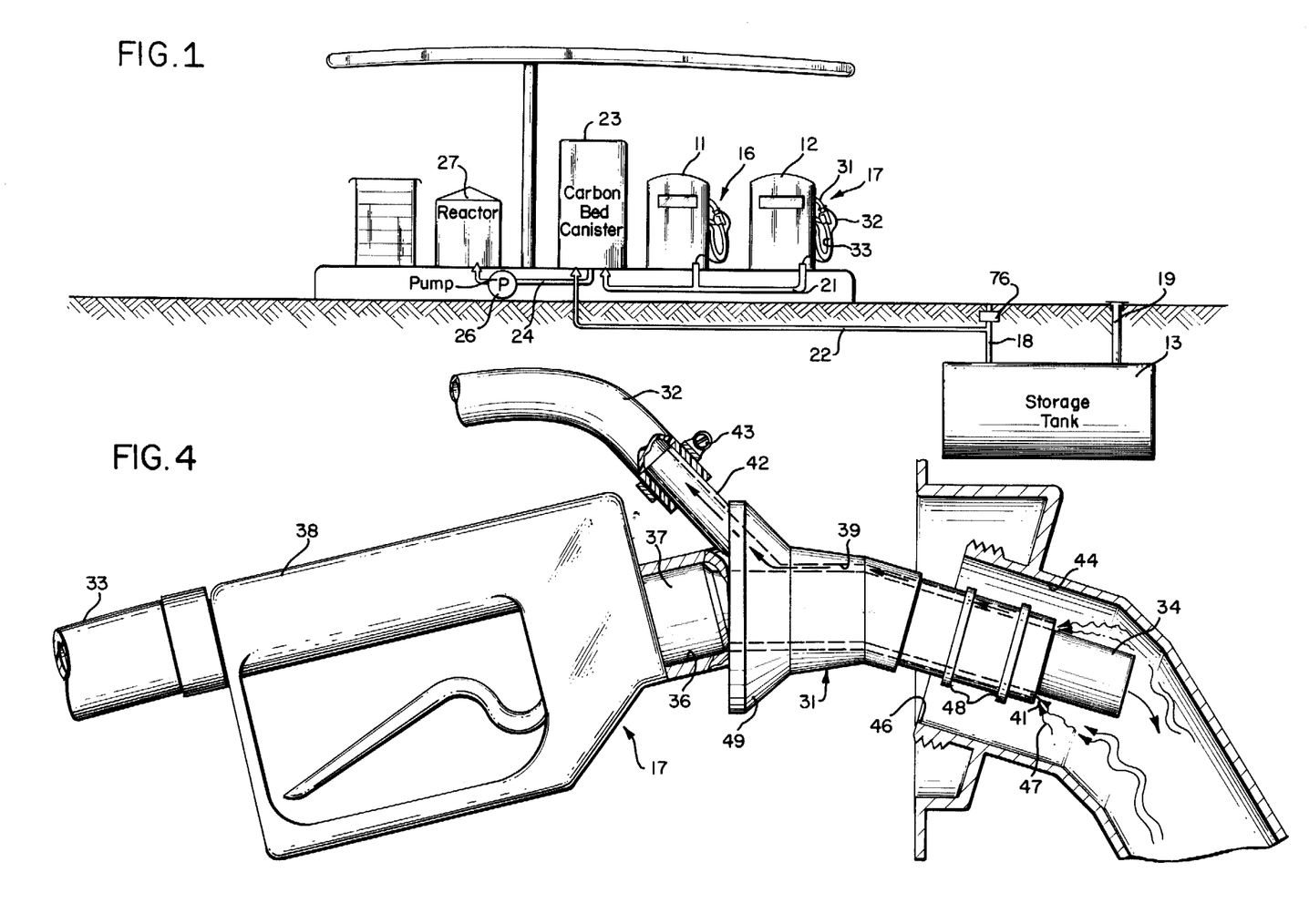
FIG. 1 is a plan view partly in section illustrating the installation of one particular embodiment of the vapor collection and disposal apparatus according to the present invention.
FIG. 4 is an enlarged plan view, partly in section, showing one embodiment of the improved vapor collection attachment for use with a conventional fuel dispenser nozzle for collecting fuel vapors for the apparatus shown in FIGS. 1 through 3.

One exemplary installation of the method and apparatus for collecting and disposing of fuel vapors is illustrated in FIG. 1. In this instance, a typical service or gasoline station is illustrated including first and second gasoline pumps or dispensers 11 and 12 for pumping fuel from an underground bulk storage tank 13. Dispensers 11 and 12 are each provided with a manually operated valve and nozzle assembly 16 and 17 which have been specially modified as described more fully hereinafter to capture or collect fuel vapors emitted during fueling operations. Also, a vent piping or conduit 18 provided for storage tank 13 is connected to the vapor collection and disposal apparatus illustrated in FIG. 1 to capture excess fuel vapors otherwise emitted into the surrounding atmosphere during and after bulk transfers of fuel to tank 13 through a filler opening 19.

Both the refueling operations provided by nozzle assembly 16 and 17 of dispensers 11 and 12 and the bulk transfers or bulk fuel drops to underground storage tank 13 represent in general the transfer of fuel from one container to another. The present invention in general is capable of preventing undesirable hydrocarbon fuel vapor emissions normally occurring during such fuel transfers.

For this purpose, vapors otherwise escaping during the use of dispensers 11 and 12 or during a fuel drop to storage tank 13 are captured and passed on downstream of the system via vapor collection lines or conduits 21 and 22. The collected vapors are thereupon fed into a temporary storage chamber or zone which as more fully described herein includes a substance for adsorbing the gasoline or fuel vapors. In the embodiments described herein, one or more canisters 23 containing carbon granules are employed to provide the temporary vapor storage zone.

The beds of carbon granules serve to store peak fuel vapor emissions for later retrieval and combustion at a low fuel to air ratio. Following the temporary storage in the carbon bed canisters 23, the fuel vapors are forced over a connecting conduit 24 by an air pump 26 to a combustion chamber for complete oxidation. Preferably, the oxidizing chamber is provided by a catalytic reactor 27 which is operated at a low fuel to air ratio for substantially complete oxidation of the hydrocarbon vapors into water vapor and carbon dioxide.

To capture substantially all of the hydrocarbon vapors emitted during refueling operations, dispenser nozzle assemblies 16 and 17 are specially modified as best shown in FIG. 4 to include a nozzle attachment 31. This attachment operates with a source of low pressure or partial vacuum available via a flexible hose 32 which is extended to the vapor collection conduit 21 for dispensers 11 and 12. In this instance, attachment 31 and hose 32 are illustrated in combination with nozzle assembly 17 of dispenser 12. Hose 32 may be dressed alongside the fuel hose 33 as best shown in FIG. 1. Attachment 31 has a generally elongated hollow cylindrical form, slightly bent at one or more places along the axis thereof so as to fit coaxially about the elongated nozzle 34 of the usual configuration. The standard nozzle assembly may include a wire spring-like structure adjacent the assembly handle and such structure may be removed prior to the mounting of attachment 31.

An interior cylindrical wall portion 36 of attachment 31 is adapted to be affixed to an exterior cylindrical portion 37 of nozzle 34 adjacent handle 38. By proper dimensioning of attachement 31, the remaining interior wall portion 39 thereof is selectively spaced away from the exterior cylindrical surface of nozzle 34 to form an annular passage along the body of the nozzle. More particularly, by providing a length of attachment 31 which is less than that of nozzle 34, a forward annular inlet 41 is formed between wall portion 39 of the attachment and the adjacent exterior wall of nozzle 34 for drawing or sucking in substantially all of the fuel vapors present in the zone surrounding this annular inlet. A partial vacuum or pressure differential is formed at the annular inlet relative to the surrounding or ambient pressure by connecting hose 32 to a tubular connector 42, here integrally formed with attachment 31, and having an interior passage communicating with the annular passage associated with inlet 41. A suitable clamp 43 may be provided to secure hose 32 to connector 42.

With the entire nozzle assembly including the forward portion of attachment 31 inserted into the neck 44 of a vehicle fuel tank filler opening 46, all the hydrocarbon vapors 47 drifting upwardly toward opening 46 are sucked into the annular inlet 41 by the partial vacuum supplied over hose 32. Attachment 31 may be provided with one or more exterior annular ridges 48 provided in lieu of the aforementioned nozzle spring structure to prevent the nozzle assembly from slipping out of the filler opening if left unattended. Additionally, the attachment 31 may include a rearwardly flared annular flange portion 49 positioned forwardly of the rearwardly inclined connector 42. Flange 49 serves as a shield protecting the rearwardly extending connector 42 and also as a stop for engaging filler opening 46. As an advantage of this collection means, no seal is required between the attachment 31 and the filler opening 46 thus simplifying its use and enhancing its reliability.

Figure 2:
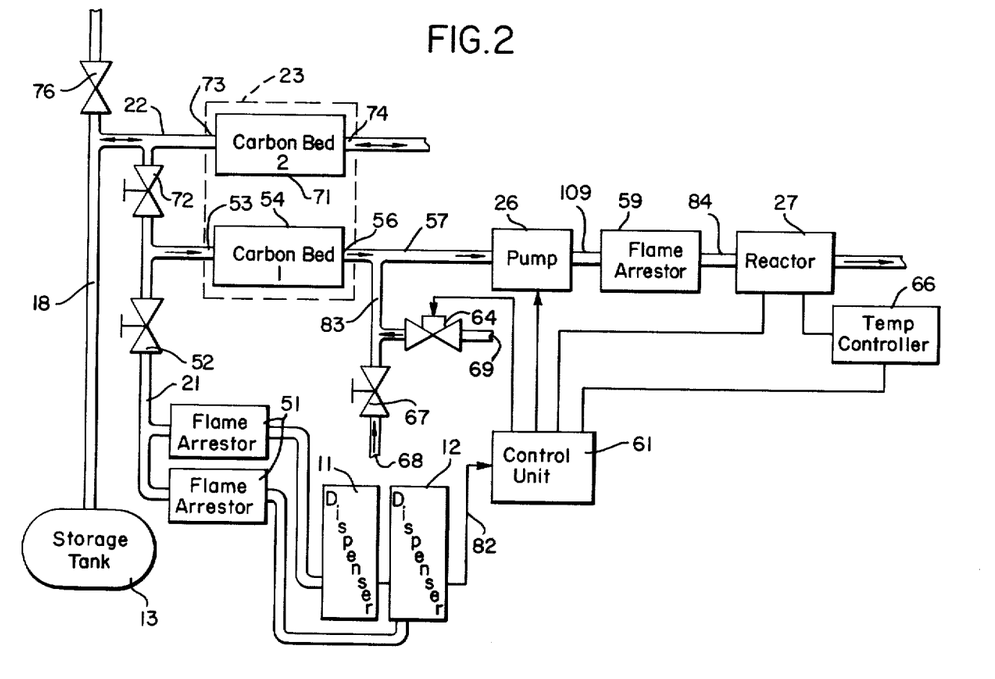
FIG. 2 is a detailed diagram of the components for the installation shown in FIG. 1.
Figure 3:
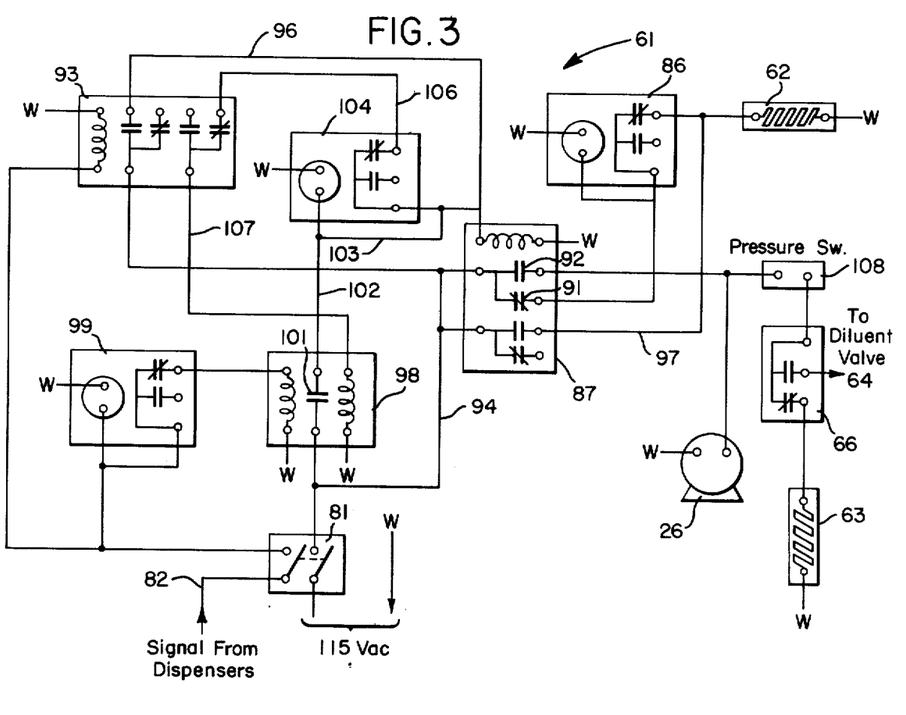
FIG. 3 is a detailed electrical diagram of the control system used for the apparatus of FIGS. 1 and 2.

Usually, each dispenser nozzle assembly will be provided with a vapor collection attachment 31 as shown for assembly 17. The associated collection hoses, such as hose 32 for assembly 17 are jointly fed to the vapor collection conduit 21 for subsequent disposal of the vapors. The number of nozzle assemblies and dispensers will, of course, vary from installation to installation, and in general the method and apparatus of the present invention may be adapted to serve any number of dispensers and dispenser nozzles. With reference to FIGS. 2 and 3, the illustrated system is suitable for lower volume stations, such as those having two dispensers with an approximate thru-put of ten thousand gallons per month and a bulk storage tank capable of receiving a five thousand gallon drop. Of course, these capacities are given merely as examples and the system shown in FIGS. 2 and 3 may be adapted in some cases to meet higher capabilities.

With particular reference to FIGS. 2 and 3, the vapor collection conduit 21 is in communication with the vapor collection attachments associated with the dispenser nozzle assemblies through one or more conventional flame arresters 51. Flame arresters like arrester 51 are provided at strategic points throughout the system as a safety feature to prevent the propagation of high temperature combustion. The outlet of conduit 21 is fed through a manually adjustable trim valve 52 to an inlet 53 of a first carbon bed 54 contained within canisters 23 of FIG. 1. An outlet 56 of bed 54 is extended through a connecting conduit 57 to an air pump 26 and from there through another flame arrester 59 to reactor 27.

A control unit 61, shown in detail in FIG. 3, serves to control pump 26, heater elements 62 and 63 of reactor 27, and to control diluent valve 64 all in response to the operation of one or more of dispensers 11 and 12 and in response to a thermostat or temperature controller 66 which monitors the reactor temperature. An additional manually controlled valve 67 serves to feed measured amounts of air through an opening 68 into the stream of fuel vapors passing through conduit 57 toward reactor 27. Similarly, diluent valve 64 is selectively opened by control unit 61 to inject further amounts of air through an opening 69 into the stream of gases carried by conduit 57.

Excessive vapors from the storage tank 13 are fed into the system over conduit 22 which is connected to a second carbon bed 71 of canisters 23 and through a manually operated trim valve 72 to inlet 53 of carbon bed 54. In addition to a first port 73 connecting carbon bed 71 to vapor collection conduit 22, a second port 74 is provided which communicates with atmospheric air. A pressure actuated breather valve 76 may be connected between the junction of conduits 18 and 22 and atmospheric air to permit the intake of atmospheric air should the pressure within storage tank 13 become excessively low due to the withdrawal of liquid fuel therefrom. Before the threshold operating pressure for valve 76 is reached however, air will be drawn through carbon bed 71, conduit 22 and conduit 18 in response to subatmospheric pressure conditions within the storage tank.

In the embodiments of the invention disclosed herein, the partial vacuum or suction created at the vapor collecting attachments mounted on each dispenser nozzle is provided by the same air pump 26 which retrieves the stored fuel vapors from the carbon beds and transfers them to reactor 27 for oxidizing. In this manner, pump 26 serves as a means for developing the partial vacuum or suction on vapor collection conduits 21 and 22 and as a means effecting the transfer of the vapor into the reactor. As previously mentioned, the partial vacuum on collection conduit 21 is in turn extended to the various dispenser collection hoses, such as hose 32 for creating the partial vacuum or suction at annular inlet 41 of attachment 31. For the particular embodiment disclosed herein, air pump 26 may be of a constant volume type establishing a selected, constant flow of air and fuel vapor toward reactor 27.

Considering now the operation of the system shown in FIG. 2 in conjunction with the control circuitry of FIG. 3, the system is initially prepared for operation by turning on a double pole-single throw switch 81 which supplies ac line voltage which in this instance is 115 volts ac. Additionally, an electrical signal is received through switch 81 from dispensers 11 and 12 over a signal line 82 signaling control unit 61 that one or more of the dispensers is running and/or pumping fuel.

In this embodiment, when anyone or more of the dispensers is operated, this actuates air pump 26, drawing fuel vapor from vapor collection line 21, through trim valve 52 and carbon bed 54. The carbon granules within canister 23 and more particularly within carbon bed 54 act as an accumulator or temporary storage zone during peak concentrations of gasoline vapor emissions. When concentrated fuel vapor passes through carbon bed 54, a large percentage of the concentrated vapor is adsorbed by the granules. As a result, reactor 27 is not immediately overloaded with excessive fuel vapors relative to the amount of air which would cause incomplete oxidation of the hydrocarbons. Stated differently, the carbon beds serve as a buffer zone which accumulates concentrated vapors and allows them to pass at a lower rate and over a longer period of time so that reactor 27 receives a low fuel to air ratio for substantially complete conversion to water vapor and carbon dioxide. Without such a temporary storage means, an excessively high flow rate of air would be necessary at all times in order to oxidize transient perids of peak vapor concentrations.

Accordingly, after carbon bed 54 has stored by adsorption the initial concentrated fuel vapor, pump 26 is caused to continue operating to draw plain or less concentrated air through the carbon granules. As this occurs, some of the previously adsorbed vapors are desorbed and are passed through outlet 56 into conduit 57. Additional ambient air is fed into the mixture between outlet 56 and pump 26 through a diluent conduit 83 and manually controlled trim valve 67 connected to air intake 68. Valve 67 thus serves as a mixture ratio valve to maintain the desired concentration or proportion of fuel vapor to air prior to entering reactor 27.

Reactor 27 may be provided with an electric preheater 63 mounted adjacent its inlet 84 to preheat the entering mixture of air and fuel for more efficient oxidizing. Furthermore, the interior of reactor 27 may be provided with an electrical heater 62 which is energized along with pump 26 to maintain a minimum oxidizing temperature for the reactor. In lieu of preheater 63 and to conserve electrical energy, reactor 27 may further be provided with a heat exchanger, as in the case of the embodiment of FIG. 5, for raising the temperature of the inflowing fuel and air mixture by means of the higher temperature exhaust gases from the reactor.

If the reactor temperature rises above a preestablished level, a temperature controller 66 which may be provided by a thermostat switch signals the control unit 61 to open diluent valve 64 and admit more ambient air through the fuel-air mixture flowing in conduit 57. This immediately reduces the concentration of gasoline vapor in the mixture and should cause the reactor 27 to assume a lower oxidizing temperature. Also, the temperaure controller 66 as shown in FIG. 3 may be connected to deenergize preheater 63 in the event the threshold temperature level is exceeded. Thus once this threshold reactor temperature is reached, controller 66 serves to trigger two temperature reducing functions, namely the opening of diluent valve 64 and the deenergizing of preheater 63.

The reactor 27 may be of the type including platinum as the oxidizing catalyst. The platinum itself may be supported on a honeycomb structure in a manner known to those skilled in the art.

It has been discovered that improved conversion efficiency of the hydrocarbon vapors to the nonpollutants of water and carbon dioxide is obtained by running pump 26 for a substantial period following any dispenser operation. More particularly in this embodiment, an electric timer 99 together with a stepping relay 98 and another timer 104 are used to cause pump 26 to operate for a selected interval following any refueling by dispensers 11 and/or 12. As mentioned above, the forcing of ambient air through carbon bed 54 over an extended period of time and at a relatively low flow rate serves to produce a proper stoichiometric amount of fuel to air mixture for injection into the reactor. As an example, a period in the range of one hour for running of pump 26 has been found suitable for this purpose.

The foregoing operation serves to collect and dispose of substantially all of the fuel vapors emitted during use of dispensers 11 and/or 12. Additionally, one of the advantages of the present embodiment is its ability to collect and dispose of excessive fuel vapors otherwise emitted into the atmosphere during and after bulk deliveries of gasoline to storage tank 13. These deliveries are sometimes referred to as a bulk drop of gasoline.

Preferably, vapor return trucks should be used in making gasoline drops to tank 13 in order to capture and return vapors to the delivery truck which might otherwise escape while the tank is being filled. However, even with the use of vapor return trucks, some excess vapors are not retrieved by the tank truck after filler opening 19 as shown in FIG. 1 is closed and sealed. These excess vapors flow into vent conduit 18 and from there into vapor collection line 22. Breather valve 76 will normally remain closed and only open in the event of an unsafe level of subatmospheric pressure within storage tank 13.

These excessive fuel vapors pass from conduit 18, through collection conduit 22 and into carbon bed 71 of canisters 23. Concentrated fuel vapors are adsorbed into the carbon granules of bed 71 which in a manner similar to carbon bed 54 serves as a temporary storage zone for these vapors. When gasoline or other fuel is dispensed from tank 13, air is drawn into the tank through port 74, carbon bed 71, port 73, conduit 22 and conduit 18. This is a natural consequence of reducing the amount of fuel in tank 13 and thus causing a reduced pressure in the air and gas vapors overlying the liquid fuel. The reduced pressure causes the ambient air to flow in through carbon bed 71 removing by desorption some of the previously adsorbed vapor and returning it to the storage tank. This causes a partial cleansing or purging of carbon bed 71 over the period of time taken to empty storage tank 13 of the stored liquid fuel.

Further cleansing of bed 71 is achieved by drawing a small flow of air through port 74 and trim valve 72 into carbon bed 54 each time pump 26 is caused to be operated by the dispensing of fuel. Repeated operations of pump 26 by dispensers 11 and/or 12 over the period of time between gasoline drops, incrementally cleanses carbon bed 71 of remaining fuel vapors not returned to storage tank 13. This ensures that the carbon bed associated with the storage tank will be clean before the next gasoline delivery.

Although the control functions performed by unit 61 of FIG. 2 may be accomplished by many different control circuit designs, FIG. 3 illustrates one exemplary circuit. The various relay, timer and temperature controller contacts are shown in a standard notation as exemplified by normally closed contacts 91 and normally open contacts 92 of pump motor relay 87. The system is ready for operation by closing double pole, single throw switch 81 to connect the line voltage, in this instance 115 volts ac, to the circuitry. Even before any gasoline or fuel is dispensed, the closure of switch 81 establishes electrical power to reactor heater 62 through a set of normally closed contacts of relay 87 and through timer 86. Timer 86 serves to periodically energize heater 62 to maintain a suitable minimum temperature within the reactor.

Anytime a signal is received from one of the dispensers over line 82 indicating that gasoline is being pumped, a relay 93 is energized which in turn energizes pump motor relay 87 over connecting lines 94 and 96. This immediately provides power to pump 26 which begins pumping a flow of air through the carbon bed 54 and vapor collection line 21 creating a partial vacuum at the annular vapor collection inlet provided on each dispenser nozzle. Vapors are thereupon drawn in through the carbon bed and processed in the aforementioned manner. Also, when relay 87 is actuated, heater 62 becomes directly energized over connecting lines 94 and 97 through a set of normally open contacts of the relay.

In addition to operating relay 93, each dispenser signal received over line 82 causes a timer 99 to advance a stepping relay 98 from the normally open position of its contacts 101 to one of a number of closed contacts. Timer 99 periodically operates in response to a continuous dispenser signal to step the relay 98, each advancement causing the relay to store additional time increments for holding motor relay 87 energized over line 102. The closing of contacts 101 establishes electrical power to connecting line 102 for a timed interval to continue the operation of pump 26 even after the dispensers have completed one or more refueling operations and have been returned to an inactive state.

Thus, pump motor relay 87 remains energized over connecting lines 102 and 103 even though relay 93 becomes deenergized by the loss of the dispenser signal over line 82. This condition persists for an interval determined by the previous advancement of relay 98 and a timer 104. At the end of this time which may be selected to be on the order of 1 hour depending on the prior activity of the dispensers, pump 26 continues to run scavenging hydrocarbons from the storage bed 54 passing them on into the reactor for oxidation. The time interval is selected so as to cause substantially complete cleansing or purging of th carbon bed 54 to prepare it for the next dispensing operation. During the continued running of pump 26, timer 104 serves to periodically step stepping relay 98 back through the multiple positions toward the home position where contacts 101 are open. This is provided over line 106, through a set of normally closed contacts of relay 93 and over a connecting line 107.

In addition to the foregoing control features, a pressure responsive switch 108 may be provided in series with temperature controller or thermostat 66 as shown. The switch may be mounted in the discharge or outlet line 109 of pump 26 so as to monitor the pressure of air and fuel vapor being injected into reactor 27. Should the pump fail, this pressure will drop, pressure switch 108 responsively opens and interrupts the electrical power to diluent valve 64 and preheater 63 which turns off preheater 63 preventiing burnout of the reactor.

In this manner, hydrocarbon pollutants are automatically collected and safely disposed of. Although a particular and at this time preferred apparatus has been illustrated for the collection and disposal operations, other apparatus may be employed for performing the method of the present invention. This method includes the steps of collecting substantially all the fuel vapors which otherwise may escape into the ambient atmosphere by forming a zone of low pressure which is less than the ambient pressure to force the vapors into such collection zone. This is provided in the present apparatus by the attachment 31 and its associated vapor collection hose 32 mounted on dispenser nozzle assembly 17.

Next, these collected vapors are passed from the collection zone into a temporary storage zone provided by the carbon granules or other adsorbing substance disposed within canisters 23. The passage of these vapors into intimate contact with the adsorbent substance serves to accumulate excessive or highly concentrated fuel vapors for later disposal over a lower constant flow rate.

The temporarily stored vapors are thereafter desorbed or drawn out of the storage zone by passing air into contact with the adsorbent substance. As previously described, one apparatus for achieving this step is through the use of pump 26 which even after dispensers have stopped operating continues to draw air through carbon bed 54. Thus, the vapors are removed from the carbon bed at a rate of flow determined by pump 26 and this air and vapor mixture is passed onto reactor 27.

Thus, another step of the process is to feed this mixture of air and fuel into an oxidizing chamber for oxidizing at a temperature sufficient to cause the fuel and air mixture to completely oxidize forming water and carbon dioxide. The oxidizing chamber preferably includes an oxidizing catalyst such as the aforementioned platinum supported on a honeycomb structure, a construction which is known to those skilled in the art. In order to maintain the reaction within the oxidizing chamber at a safe level, a mixture in which an amount of air in excess of the stoichiometric amount may be used. By using an excess of air, explosive combustion within the reaction chamber is avoided.

Figure 5:
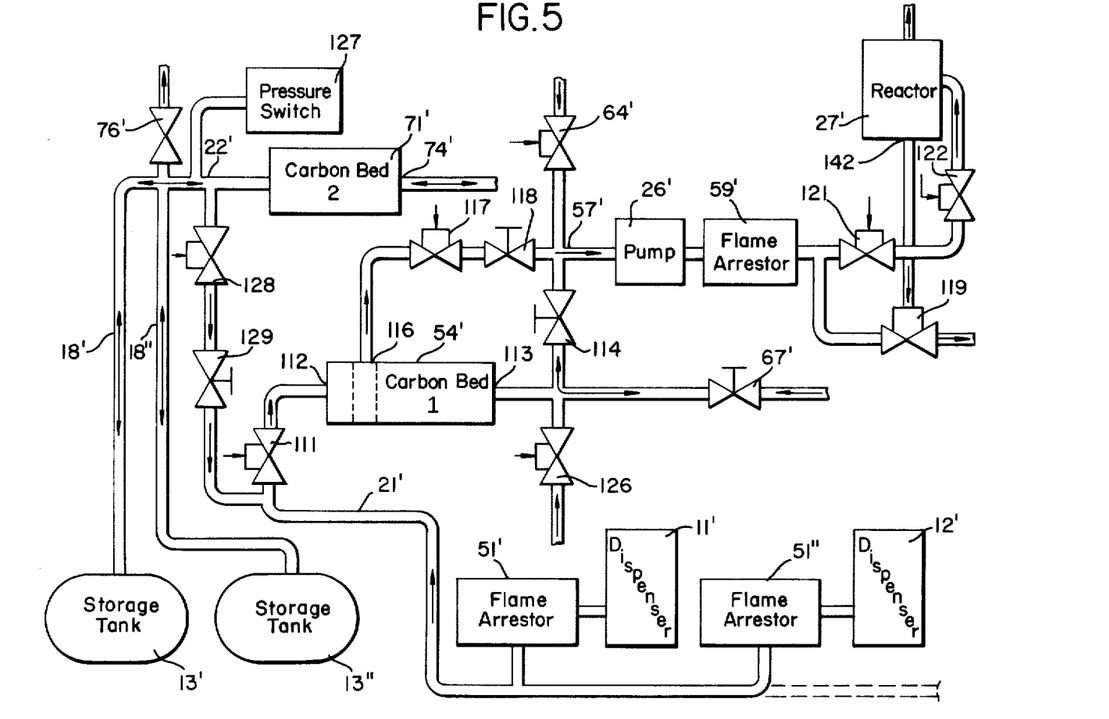
FIG. 5 is a detailed diagram of an alternate form of the collection and disposal apparatus.
Figure 6:
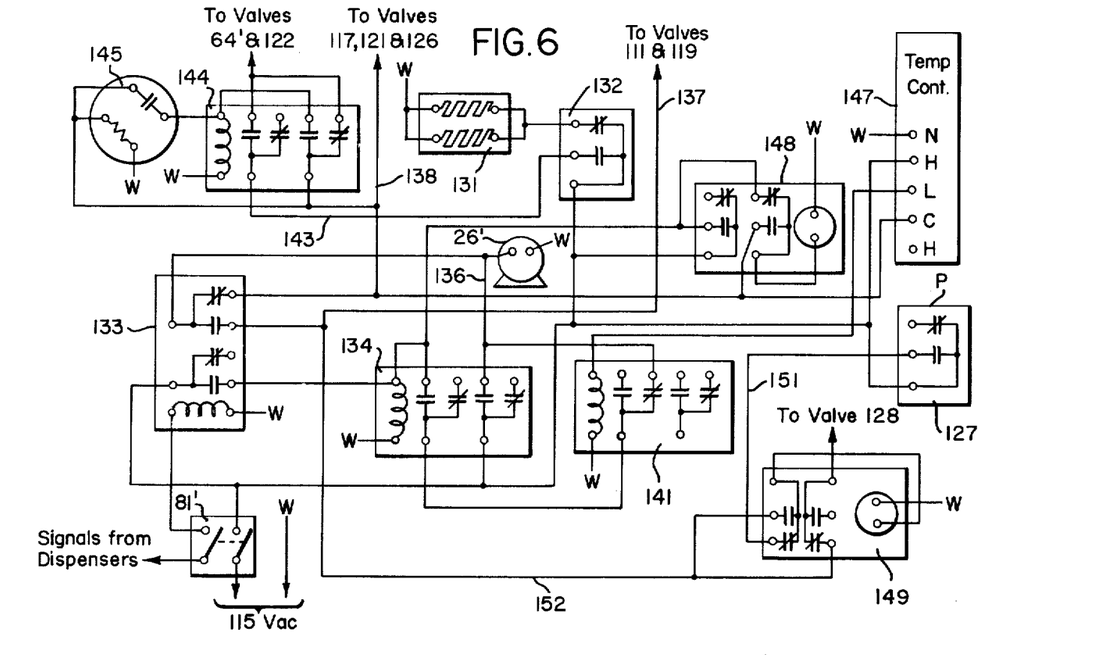
FIG. 6 is a detailed electrical diagram of the control system for the apparatus of FIG. 5.

With reference to FIGS. 5 and 6, an alternative preferred embodiment is shown, having a vapor disposal capacity which is somewhat greater than that of the embodiment shown in FIGS. 1 through 3. As an example, the system of FIGS. 5 and 6 is capable of handling a monthly through-put of 40,000 gallons of dispensed gasoline, and a maximum bulk drop of 9,000 gallons. Again these figures are merely exemplary only, and of course the various systems may be designed to meet larger or smaller quantities.

In describing the system of FIGS. 5 and 6, primed reference numerals have been employed to indicate where applicable corresponding or similar components, having the same unprimed reference numeral, in the previously described embodiment. Thus in FIG. 5, fuel vapors are collected in a collection conduit 21' from dispensers 11' and 12', temporarily stored in a carbon bed 54' and subsequently transferred by a pump 26' to a reactor 27' at which the conversion to water vapor and carbon dioxide takes place.

In this system, the adsorption and subsequent desorption of fuel vapors in carbon bed 54' is carried out in a similar but different manner. In this instance, an electrically controlled solenoid valve 111 is disposed between collection conduit 21' and an inlet 112 of carbon bed 54'. During the accumulation or temporary storage of vapors, air is drawn through the carbon granules in bed 54' through inlet 112 and a port 113 by pump 26' operating through a manually controlled valve 114. The extent of carbon bed 54' is selected in this instance such that substantially all of the fuel vapors are adsorbed in the bed prior to the discharge of air from port 113.

Subsequently, during regeneration of carbon bed 54' and the disposal of the accumulated hydrocarbon therein, air is circulated in a reverse direction through port 113 and an outlet 116 positioned adjacent inlet 112, where the removed vapors are passed through an electrically controlled solenoid valve 117, a manually controlled valve 118, pump 26' and from therein to reactor 27' for oxidation. When carbon bed 54' is being loaded or stored with fuel vapors, an electrically controlled solenoid valve 119 is open discharging air circulated by pump 26' to ambient atmosphere while another electrically controlled solenoid valve 121 is closed. On the other hand during purging or regeneration of carbon bed 54', the operations of valves 119 or 121 are reversed so as to pass the fuel and air mixture into the reactor.

To maintain a limit on the reaction temperature within reactor 27', an electrically controlled solenoid bypass valve 122 may be operated to bypass a heat exchanger within reactor 27'. Also as in the case of the previously described embodiment, an electrically controlled diluent valve 64' serves to add additional air to the system to reduce the temperature level of the reaction. During rejuvenation of carbon bed 54', an electrically operated solenoid valve 126 is opened to allow a flow of air in through port 113 and through carbon bed 54' to outlet 116 in the manner described above. A manually controlled trim valve 67 in the system of FIG. 2 may also be provided to regulate the flow of air drawn through bed 54' between inlet 112 and port 113 while it is accumulating fuel vapors.

In this embodiment, the collection and disposal of vapors associated with the bulk transfer of fuel to storage tanks 13' and 13'' is effected in a similar but different manner from that of the previously described system. Here, a pressure sensitive switch 127 senses excessive vapor pressure in collection line 22' indicating that a fuel drop has occurred. Thereupon, through a series of selective control operations more fully described herein, electrically operated solenoid valve 128 is first closed and later opened to cause the cleansing or regeneration of carbon bed 71'. During a first interval following a fuel drop, valve 128 is closed causing air to flow through carbon bed 71' from port 74' and into the storage tanks 13' and 13'' in the manner described above in connection with FIG. 2. After a predetermined amount of fuel has been dispensed from the storage tanks, valve 128 is caused to open allowing regeneration of carbon bed 71' through valve 128, a manually controlled trim valve 129, valve 111 and carbon bed 54'.

FIG. 6 illustrates one suitable control circuit for operating the system shown in FIG. 5. Considering the control functions of the circuit in FIG. 6 during various operating modes of the system, the apparatus is initially turned on by switch 81' corresponding to switch 81 of the system of FIGS. 2 and 3. As in the previous embodiment, a line voltage of 115 volts ac may be used to operate the control functions. Prior to any dispensing, one or more electrical heaters 131 are energized through the normally closed contacts of a temperature controller or thermostat 132 which may be set to switch at a preselected high temperature, for example in this embodiment on the order of 1,200°F.

When a signal is received from one or more of the dispensers, a relay 133 is energized which in turn energizes a holding relay 134 supplying power to the motor of pump 26' over a line 136. Simultaneously, valves 111 and 119 are maintained open by relay 133 over a connecting line 137 and vallves 117, 121 and 126 are closed or deenergized by relay 133 over a connecting line 138 establishing the aforementioned condition for accumulating vapors in carbon bed 54'.

Pump 26' is maintained in its energized condition even after the dispensers become inactive by the latching of relay 134 on a set of normally closed contacts of a relay 141. Relay 141 maintains the system in a vapor collection and disposal mode for the duration necessary to accumulate and thereafter dispose of the noxious vapors in reactor 27'. Upon the termination of any dispensing activity, relay 133 becomes deenergized causing valves 111 and 119 to close and valves 117, 121 and 126 to open. This establishes the system mode described above whereby hydrocarbons are scavenged from bed 54' by circulating a flow of air through valve 126, port 113, bed 54', outlet 116, through valve 117 and from there through the pump to the reactor. During this mode rather than passing air out through valve 119 to ambient atmosphere, the mixture of fuel and air is passed through valve 121 which is now open and into reactor 27' through an inlet 142. Relay 134 remains energized by the normally closed contacts of relay 141 thus sustaining the pump operation.

If the temperature in the converter rises to or above a predetermined level, for example in the range of 1,200° F. to 1,300° F. in the present embodiment, then temperature controller 132 switches and causes the diluent valve 64' and a heat exchanger bypass valve 122 to open. This operation is effected by energizing these valves over a connecting line 143 and through the various contacts of a relay 144. Relay 144 is in turn energized through a delay relay 145 by the set of normally closed contacts of dispenser relay 133 which also control connecting line 138 of valves 117, 121 and 126.

Valve 122 is connected as shown in FIG. 5 to bypass a heat exchanger mounted adjacent the inlet 142 to reactor 27'. The heat exchanger normally maintains the reactor 27' charged by circulating the cool inlet gases adjacent conduits curing the hot exhaust gases. However when the temperature in the reactor becomes excessive, the bypass valve 122 serves to reduce the operating temperature by bypassing some of the cool air directly into the reactor and around the heat exchanger. Also as in the previous embodiment, the diluent valve 64' serves to add additional air to the system for reducing the reactor temperature.

As soon as reactor 27' has disposed of most of the accumulated vapors, its temperature reduces to a low threshold level detectable by temperature controller 147. Upon reaching this relatively low temperature which may be in the range of 800° F. to 900° F., for example, then the system is placed in a shut-down condition awaiting the next dispenser action.

More particularly, temperature controller 147 signals relay 141 when this low temperature condition has been reached, causing relay 141 to be energized and thus unlatching relay 134. In this particular embodiment, terminals L and C of controller 147 are open above the low level threshold temperature, e.g. in the range of 800° F. to 900° F., and closed below this temperature level. Thus, relay 141 is connected to be energized when the L and C terminals of controller 147 become closed or connected.

If desired, a timer 148 may be provided for monitoring the amount of time during which the dispensers are activated and maintaining the pump 26' operating for a predetermined time interval, for example 10 minutes following the last dispenser activity before temperature controller 147 is allowed to shut down the system by operating relay 141 and unlatching relay 134.

To dispose of the excess vapors resulting from a gasoline drop, the pressure sensitive switch 127 is connected in combination with a timer 149 to provide the following operation. When a preselected threshold of vapor pressure is sensed by pressure switch 127, indicating a fuel drop to storage tanks 13' and 13'', timer 147 is actuated over connecting line 151 and held energized over line 152 from dispenser relay 133. While in the timing mode, timer 149 is operated each time line 152 is energized by the operation of relay 133 in response to one or more of the dispensers. While in the timed mode, valve 128 is maintained closed, that is de-energized in this instance by reason of the normally closed contacts of timer 149 being held open. Accordingly, the timer is operated only during dispensing of fuel, and during this time the valve 128 is maintained closed such that air is forced in through port 74' through carbon bed 71' into storage tanks 13' and 13''. As mentioned above, this provides an initial regeneration or purging of the carbon bed used for accumulating the bulk transfer vapors.

The timer 149 is selected to provide a suitably long interval, for example on the order of 6 hours in this embodiment, representing 6 hours of gasoline dispensing from the storage tanks. That is, the timer marks off time only during the operation of one or more of the dispensers. The time interval has been selected to correspond to a certain amount of transfer of fuel out of the storage tanks and thus a predetermineable amount of flow of air through carbon bed 71' into the tanks.

At the end of the timed interval, timer 149 reverts to its original or unactuated condition in which valve 128 is operated over connecting line 152 each time dispenser relay 133 is energized. By this mode of operation, valve 128 is opened jointly with valve 111 and 119 providing for the regeneration of carbon bed 71' through carbon bed 54'. In other words, any remaining fuel vapor accumulations in carbon bed 71' are transferred to carbon bed 54' for subsequent removal therefrom and disposal along with the vapors arriving over collection line 21' from the dispensers.

While only a limited number of embodiments of the present invention have been disclosed herein, it will be readily apparent to persons skilled in the art that numerous changes and modifications may be made thereto without departing from the spirit of the invention. For example, although the embodiments disclosed herein advantageously provide for disposal of vapors from both the dispenser nozzles and excess vapors from a bulk fuel drop, the present invention may be adapted to collect and dispose of vapors from either one of these sources individually. It may thus be desired to provide for collection and disposal of vapors from dispenser nozzles only, and in such case that portion of the systems disclosed herein which collect vapors from the dispenser collection line 21 and 21' may be processed separately. Similarly, vapors associated only with the bulk transfer of fuels may be disposed of separately.

In addition to these other modifications within the spirit of the invention will be apparent. For example, vapors collected from the dispenser nozzles may be forced into the storage tanks and retrieved therefrom through the vent conduit in a manner similar to the collection and disposal of vapors from storage tanks 13, 13' and 13''. In such case, the vapors from both the dispenser source and the bulk transfer source are advantageously captured and disposed of.

To increase the capabilities of the various systems, it is contemplated within the spirit of the present invention to provide additional carbon beds and redundant flow lines to enable the temporary storage of a greater quantity of concentrated fuel vapors. For example in the system shown in FIGS. 5 and 6, the single carbon bed 54' may be supplemented by one or more additional carbon beds operating in parallel or alternately with carbon bed 54' to adsorb peak emissions. For example, a timer may be provided in the control circuit for alternately directing concentrated vapors received over collection conduit 21' into alternate passages leading to alternate ones of the multiple carbon beds.

Retrieval of the temporarily stored vapors may be recombined prior to entering reactor 27' such that the entire flow from all the carbon beds may be oxidized in a single reactor.

In this view, the foregoing disclosure and description therefor are to be taken as illustrative only and not in anyway to limit the invention which is defined only by the following claims.

We claim:

1. A method for preventing hydrocarbon fuel vapors from contaminating the ambient atmosphere while said fuel is being transferred from a first container to a second container having an opening for receiving said fuel from said first container, said first container having fuel outlet means and collection means adapted to fit loosely in said second container opening comprising:

inserting said fuel outlet means and said collection means into said second container opening such that said second container remains open to the ambient atmosphere at said opening during the fuel transfer;

collecting, in said collection means, substantially all of the fuel vapors otherwise escaping from said second container opening while receiving fuel from said outlet means by forming an annular collection zone of low pressure lying about said outlet means and a high pressure zone between said collection zone and said second container opening, the low pressure in said collection zone having a pressure lower than ambient pressure and said high pressure zone to force the fuel vapors from said second container and air from said high pressure zone into said collection zone;

passing said vapors from said collection zone into a temporary storage zone and into intimate contact with an adsorbent substance in said storage zone whereby said vapors are adsorbed on said substance;

removing said adsorbed vapors from said adsorbent substance by passing air into contact with said substance whereby said vapors are removed therefrom forming an air and vapor mixture; and transferring said air and vapor mixture into an oxidizing chamber containing an oxidizing catalyst and contacting said mixture with said oxidizing catalyst at a temperature sufficient to cause said fuel vapor and air mixture to substantially completely oxidize to form water and carbon dioxide.

2. The method of claim 1 further defined by said step of removing said adsorbed vapors from said adsorbent substance being carried out over a time period selected to remove substantially all of the adsorbed fuel vapors and wherein said time period continues beyond the time necessary to complete the transfer of said fuel from said first container to said second container.

3. The method of claim 1, said step of passing said vapors into a temporary storage zone being further defined as passing said vapors into an inlet of a canister containing carbon granules as said adsorbent substance, and said step of removing said adsorbed vapors being further defined as drawing air from said canister through an outlet adjacent said inlet.

4. The method set forth in claim 1 further defined by said steps of collecting said fuel vapors, passing said vapors from said collection zone to a temporary storage zone, removing said adsorbed vapors from said adsorbent substance and feeding said air and fuel mixture into an oxidizing chamber being provided in part by pumping air and fuel vapor from said collection zone through said carbon bed and into said oxidizing chamber, and further comprising the steps of sensing when said fuel is being transferred from said first to said second containers, and pumping said air during and for a selected time interval after the transfer of said fuel.

5. The method of claim 4, further comprising the step of monitoring the temperature within said oxidizing chamber and introducing additional ambient air into said fuel vapor and air mixture when such temperature exceeds a predetermined level.

6. A method of collecting and disposing of fuel vapors emitted during transfers of fuel from a fuel outlet means to a fuel receiving means, comprising the steps of:

collecting such fuel vapors at the location of the fuel transfer such that the fuel receiving means remains open to the ambient atmosphere during the fuel transfer;

passing said fuel vapors into contact with an adsorbent substance to cause at least a portion of said fuel vapors to be adsorbed for temporary storage therein;

retrieving said stored fuel vapors by passing air in contact with said substance to form an air and fuel vapor mixture; and feeding said air and fuel vapor mixture into an oxidizing chamber to cause substantially complete oxidation of said mixture into water and carbon dioxide.

7. The method set forth in claim 6, wherein said transfers of fuel include both the dispensing of fuel for vehicular use and bulk transfers of fuel to storage tanks supplying fuel for said dispensing, wherein:

said step of collecting fuel vapors includes the substeps of collecting fuel vapors associated with said dispensing and separately collecting the fuel vapors associated with said bulk transfers to the storage tank;

said step of passing said fuel vapors into an adsorbent substance includes the substeps of passing fuel vapors associated with said dispensing operations into a first container including said adsorbent substance and passing those fuel vapors associated with the bulk transfer of fuel into a second container including said adsorbent substance;

said step of retrieving said stored fuel vapors includes the substep of drawing air through said first and second containers of said adsorbent substance to form said air and fuel vapor mixture for oxidation in said oxidizing chamber; and further comprising the step of partially regenerating the adsorbent substance in said second chamber by drawing air through said second chamber into said storage tank by the reduced pressure in said storage tank resulting from dispensing of fuel therefrom.

8. The method of claim 6 wherein said transfers of fuel include both the dispensing of fuel from dispensers for vehicular use and the bulk transfer of fuel to one or more storage tanks serving as the fuel supply for the dispensers, and wherein:

said step of collecting said fuel vapors includes the substeps of separately collecting the fuel vapors associated with the dispensing operation and with the bulk transfer of fuel to the storage tank;

said step of passing said fuel vapors into contact with an adsorbent substance includes the separate substeps of passing said fuel vapors collected from said dispensing operations into a first canister containing said adsorbent substance and passing the fuel vapors associated with said bulk transfers to a second canister also containing said adsorbent substance to cause temporary storage of said fuel vapors therein; and said step of retrieving said stored fuel vapors includes the substeps of drawing air through said first canister to form said mixture for oxidizing in said oxidizing chamber, sensing a preselected fuel vapor pressure in said storage tank and in response thereto passing air through said second canister into said first canister to cause the fuel vapors previously adsorbed in said second canister due to said bulk transfer of fuel to be retrieved therefrom through the adsorbent substance in said first canister.

9. The method as set forth in claim 6 being further defined by said adsorbent substance being comprised substantially of carbon granules held in a canister having an inlet, an outlet positioned adjacent said inlet and a port remotely located relative to said inlet and outlet, said step of passing fuel vapors into contact with said carbon granules being provided by establishing a flow of air and fuel vapor through said inlet and said port to cause substantially all of the fuel vapors to be temporarily adsorbed by said carbon granules, and said step of retrieving said stored fuel vapors being provided by passing air through said port and said outlet to form said air and fuel vapor mixture.

10. An apparatus for collecting and disposing of vapors emitted during the dispensing of fuel through a dispenser nozzle, comprising:
    vapor collection attachment means for mounting on said dispenser nozzle and forming an annular channel about the exterior of said nozzle, said vapor collection attachment means including means for providing a loose fit of said vapor collection attachment means into a container opening such that said annular channel can communicate with the ambient atmosphere;
    means for drawing a partial vacuum in said annular channel to draw into said annular channel air and fuel vapors;
    temporary fuel vapor storage means connected to said annular channel and including a vapor adsorbent substance for adsorbing at least a portion of said fuel vapors;
    catalytic reactor means for oxidizing an air and fuel vapor mixture into water and carbon dioxide; and
    means for directing air through said temporary storage means to desorb said fuel vapor therefrom and form an air and fuel vapor mixture and to transfer said mixture into said reactor means, whereby concentrated fuel vapors are temporarily stored in said storage means and thereafter removed from said storage means in an air and fuel mixture for substantially complete oxidation in said reactor means.

11. The apparatus as defined in claim 10 further comprising:
    vapor collection conduit means connected between said vapor collection means and said temporary storage means, additional conduit means connected between said storage means and said reactor means; and
    air pump means disposed in said additional conduit means between said storage means and said reactor means for drawing air and fuel vapors in through said collection means and collection conduit means into said storage means, said air pump means further providing said means for forcing air through said storage means to form said air and fuel vapor mixture and for transferring said mixture to said reactor means for oxidation therein.

12. The apparatus of claim 11 for collecting and disposing of vapors emitted during the dispensing of fuel from dispensers connected to a bulk storage tank, at least one of said dispensers having an elongate nozzle assembly for being positioned within an opening of a container for receiving fuel, wherein;
    said vapor collection means includes a substantially hollow cylindrical attachment adapted to be coaxially mounted about said nozzle assembly to define an annular vapor collection inlet encircling said nozzle assembly and communicating with said vapor collection conduit means.

13. The apparatus set forth in claim 12 for collecting and disposing of fuel vapors emitted during the dispensing of fuel from a dispenser, further comprising:
    electrical signal means providing a signal in response to operation of said dispenser;
    temperature sensing means for providing an electrical signal responsive to the temperature of said reactor means indicating the activity of the oxidizing level in said reactor means; and
    control circuit means connected to and responsive to said signal means and said temperature sensing means to initially energize said air pump in response to said signal indicating operation of said dispenser and de-energizing said air pump in response to a signal from said temperature sensing means indicating a predetermined low level of temperature in said reactor means, whereby said air pump continues to desorb fuel vapors from said temporary storage means and transfer said mixture to said reactor means until the temperature level thereof indicates that substantially all of the fuel vapors have been removed from said storage means.

14. The apparatus as defined in claim 11 for collecting fuel vapors emitted during the transfer of fuel from a dispenser, and further comprising:
    electrical signal means sensing the operation of said dispenser during the dispensing of fuel therefrom;
    timer circuit means connected to and for operating said air pump in response to said signal means, said timer means functioning to operate said air pump for a selected time period during and after the operation of said dispenser, whereby air continues to be forced through said temporary storage means following the dispensing of fuel to desorb fuel vapors therefrom.

15. The apparatus as defined in claim 14, wherein said timer circuit means includes means responsive to the duration of operation of said dispenser to provide a variable selected time period of continued air pump operation of the air pump is determined by the duration of the previous dispenser operation.

16. The apparatus as defined in claim 10 for collecting and disposing of vapors emitted in a zone surrounding an elongate fuel dispensing nozzle, wherein said vapor collection means comprises a hollow cylindrical attachment mounted coaxially about said nozzle and defining an annular passageway therewith communicating with an annular inlet adjacent a forward end of the nozzle and communicating with a collection conduit means adjacent the rear of said nozzle, and means for forming a relatively low level of pressure in said annular passage relative to the ambient pressure in a zone adjacent said nozzle but exteriorly of said annular inlet and passage, whereby fuel vapors in said zone are drawn into said annular inlet and from there through said annular passage into said vapor collection conduit means.

17. The apparatus as defined in claim 10 wherein said temporary vapor storage means is further defined as including a chamber within which said vapor adsorbent substance is disposed, said chamber having an inlet and an outlet proximate said inlet and a port remotely positioned from said inlet and outlet; control means initially providing said means for forcing air through said chamber between said inlet and said port to cause adsorption of fuel vapors collected by said vapor collection means and subsequently forcing air through said storage means between said port and said outlet to desorb vapors from said substance to form said air and fuel vapor mixture for oxidation in said reactor means.

* * * * *